US012280441B2

(12) United States Patent
Zhang et al.

(10) Patent No.: US 12,280,441 B2
(45) Date of Patent: *Apr. 22, 2025

(54) SWIRL RING AND CONTACT ELEMENT FOR A PLASMA ARC TORCH CARTRIDGE

(71) Applicant: Hypertherm, Inc., Hanover, NH (US)

(72) Inventors: Yu Zhang, Hanover, NH (US); Jesse A. Roberts, Cornish, NH (US); Zheng Duan, Hanover, NH (US); Michael Scheller, Grantham, NH (US); David Agan, Enfield, NH (US); Steven Moody, Charlestown, NH (US); Stephen T. Eickhoff, Hanover, NH (US); Garrett K. Quillia, Enfield, NH (US)

(73) Assignee: Hypertherm, Inc., Hanover, NH (US)

( * ) Notice: Subject to any disclaimer, the term of this patent is extended or adjusted under 35 U.S.C. 154(b) by 1139 days.

This patent is subject to a terminal disclaimer.

(21) Appl. No.: 17/146,090

(22) Filed: Jan. 11, 2021

(65) Prior Publication Data
US 2021/0136905 A1 May 6, 2021

Related U.S. Application Data

(63) Continuation of application No. 15/892,687, filed on Feb. 9, 2018, now Pat. No. 10,912,183.
(Continued)

(51) Int. Cl.
B23K 10/02 (2006.01)
H05H 1/34 (2006.01)

(52) U.S. Cl.
CPC ............ B23K 10/02 (2013.01); H05H 1/34 (2013.01); H05H 1/3468 (2021.05); H05H 1/3473 (2021.05); H05H 1/3489 (2021.05)

(58) Field of Classification Search
None
See application file for complete search history.

(56) References Cited

U.S. PATENT DOCUMENTS 3,018,360 A 1/1962 Engel
3,153,133 A 10/1964 Ducati
(Continued)

FOREIGN PATENT DOCUMENTS

CN 1642685 A 7/2005
CN 1919516 A 2/2007
(Continued)

OTHER PUBLICATIONS

Amada America Inc.,"Amada WACS System", Retrieved from the internet at: http://www.amada.de/en/laser/wacs-system.html, printed Oct. 27, 2016, 2 pages.
(Continued)

Primary Examiner — Thor S Campbell
(74) Attorney, Agent, or Firm — Cesari and McKenna, LLP

(57) ABSTRACT

A consumable cartridge for a plasma arc torch includes a cartridge frame having a first end and a second end opposite the first end, the first and second ends defining a longitudinal axis, the second end including a plurality of discrete retaining features. The consumable cartridge includes an electrically conductive contact element secured to the cartridge frame by the plurality of discrete retaining features and translatable up to a predetermined distance within the cartridge frame along the longitudinal axis at the second end, the contact element having a core, a proximal surface, and a distal surface. The proximal surface is shaped to contact a torch plunger of the plasma arc torch upon installation into the plasma arc torch and the distal surface is shaped to
(Continued)

contact an electrode of the plasma arc torch during an operation of the plasma arc torch.

23 Claims, 8 Drawing Sheets

Related U.S. Application Data

(60) Provisional application No. 62/456,813, filed on Feb. 9, 2017.

(56) References Cited

U.S. PATENT DOCUMENTS

| | | | |
|---|---|---|---|
| 3,279,177 A | 10/1966 | Ducati | |
| 3,294,953 A | 12/1966 | Spies | |
| 3,518,401 A | 6/1970 | Matthews | |
| 3,684,911 A | 8/1972 | Perugini et al. | |
| 3,794,806 A | 2/1974 | Klasson | |
| 3,996,070 A | 12/1976 | Fletcher et al. | |
| 4,011,996 A | 3/1977 | Tsuji et al. | |
| 4,034,250 A | 7/1977 | Kiselev et al. | |
| 4,087,050 A | 5/1978 | Tsuji et al. | |
| 4,125,754 A | 11/1978 | Wasserman et al. | |
| 4,311,897 A | 1/1982 | Yerushalmy | |
| 4,355,262 A | 10/1982 | Chan et al. | |
| 4,519,835 A | 5/1985 | Gauvin et al. | |
| 4,570,048 A | 2/1986 | Poole | |
| 4,620,080 A | 10/1986 | Arata et al. | |
| 4,682,005 A | 7/1987 | Marhic | |
| 4,687,139 A | 8/1987 | Lockwood | |
| 4,733,052 A | 3/1988 | Nilsson et al. | |
| 4,748,312 A | 5/1988 | Hatch et al. | |
| 4,783,004 A | 11/1988 | Lockwood | |
| 4,896,016 A | 1/1990 | Broberg et al. | |
| 4,914,271 A | 4/1990 | Delzenne et al. | |
| 4,924,060 A | 5/1990 | Delzenne | |
| 4,929,811 A | 5/1990 | Blankenship | |
| 4,940,877 A | 7/1990 | Broberg | |
| 4,948,485 A | 8/1990 | Wallsten et al. | |
| 4,967,055 A | 10/1990 | Raney et al. | |
| 4,982,067 A | 1/1991 | Marantz et al. | |
| 5,013,885 A * | 5/1991 | Carkhuff | H05H 1/28 |
| | | | 219/121.48 |
| 5,018,670 A | 5/1991 | Chalmers | |
| 5,023,425 A | 6/1991 | Severance, Jr. | |
| 5,132,512 A | 7/1992 | Sanders et al. | |
| 5,144,110 A | 9/1992 | Marantz et al. | |
| 5,183,646 A | 2/1993 | Anderson et al. | |
| 5,200,595 A | 4/1993 | Boulos et al. | |
| 5,208,441 A | 5/1993 | Broberg | |
| 5,216,221 A * | 6/1993 | Carkhuff | H05H 1/36 |
| | | | 219/121.48 |
| 5,239,161 A | 8/1993 | Lang | |
| 5,248,867 A | 9/1993 | Ohba et al. | |
| 5,309,683 A | 5/1994 | Hockett | |
| 5,317,126 A | 5/1994 | Couch, Jr. et al. | |
| 5,390,964 A | 2/1995 | Gray, Jr. | |
| 5,393,952 A | 2/1995 | Yamaguchi et al. | |
| 5,409,164 A | 4/1995 | Delzenne et al. | |
| 5,440,477 A | 5/1995 | Rohrberg et al. | |
| 5,502,245 A | 3/1996 | Dassel et al. | |
| 5,518,221 A | 5/1996 | Zurecki et al. | |
| 5,556,562 A | 9/1996 | Sorenson | |
| 5,558,842 A | 9/1996 | Vassiliou et al. | |
| 5,560,844 A | 10/1996 | Boulos et al. | |
| 5,580,531 A | 12/1996 | Vassiliou et al. | |
| 5,624,586 A | 4/1997 | Sobr et al. | |
| 5,643,058 A | 7/1997 | Erichsen et al. | |
| 5,695,662 A | 12/1997 | Couch, Jr. et al. | |
| 5,717,187 A | 2/1998 | Rogozinski et al. | |
| 5,726,414 A * | 3/1998 | Kitahashi | H05H 1/34 |
| | | | 219/121.48 |
| 5,747,767 A | 5/1998 | Severance et al. | |
| 5,796,067 A | 8/1998 | Enyedy et al. | |
| 5,801,282 A | 9/1998 | Dassel et al. | |
| 5,841,095 A | 11/1998 | Lu et al. | |
| 5,844,196 A | 12/1998 | Oakley | |
| 5,860,849 A | 1/1999 | Miller | |
| 5,874,707 A | 2/1999 | Iida et al. | |
| 5,886,315 A | 3/1999 | Lu et al. | |
| 5,897,795 A | 4/1999 | Lu et al. | |
| 5,968,379 A | 10/1999 | Zhao et al. | |
| 5,994,663 A | 11/1999 | Lu | |
| 6,084,199 A | 7/2000 | Lindsay et al. | |
| 6,096,993 A | 8/2000 | Marhic et al. | |
| 6,133,542 A | 10/2000 | Dvorak et al. | |
| 6,147,318 A | 11/2000 | Marhic | |
| 6,156,995 A | 12/2000 | Severance, Jr. et al. | |
| 6,163,008 A | 12/2000 | Roberts et al. | |
| 6,169,264 B1 | 1/2001 | Marhic | |
| 6,207,923 B1 * | 3/2001 | Lindsay | H05H 1/341 |
| | | | 219/121.48 |
| 6,248,975 B1 | 6/2001 | Lanouette et al. | |
| 6,256,873 B1 | 7/2001 | Tiffany et al. | |
| 6,320,156 B1 | 11/2001 | Yamaguchi et al. | |
| 6,337,460 B2 | 1/2002 | Kelkar et al. | |
| 6,365,867 B1 | 4/2002 | Hooper | |
| 6,444,945 B1 | 9/2002 | Maschwitz et al. | |
| 6,515,252 B1 | 2/2003 | Girold | |
| 6,525,292 B1 | 2/2003 | Girold | |
| 6,539,813 B1 | 4/2003 | Horiuchi et al. | |
| 6,616,767 B2 | 9/2003 | Zhao et al. | |
| 6,657,162 B1 | 12/2003 | Jung et al. | |
| 6,659,098 B1 | 12/2003 | Sekiva | |
| 6,703,581 B2 | 3/2004 | Jones et al. | |
| 6,713,711 B2 | 3/2004 | Conway et al. | |
| 6,717,096 B2 | 4/2004 | Hewett et al. | |
| 6,729,468 B1 | 5/2004 | Dobmeier | |
| 6,774,336 B2 * | 8/2004 | Horner-Richardson | |
| | | | H05H 1/34 |
| | | | 219/121.48 |
| 6,800,336 B1 | 10/2004 | Fornsel et al. | |
| 6,836,698 B2 | 12/2004 | Fujishima et al. | |
| 6,851,627 B2 | 2/2005 | Hashish et al. | |
| 6,852,944 B2 | 2/2005 | MacKenzie et al. | |
| 6,852,949 B2 | 2/2005 | Lanouette et al. | |
| 6,881,921 B2 | 4/2005 | Horner-Richardson et al. | |
| 6,888,092 B2 | 5/2005 | Walters | |
| 6,903,301 B2 | 6/2005 | Jones et al. | |
| 6,919,526 B2 | 7/2005 | Kinerson et al. | |
| 6,936,786 B2 | 8/2005 | Hewett et al. | |
| 6,946,616 B2 | 9/2005 | Kinerson et al. | |
| 6,989,505 B2 | 1/2006 | MacKenzie et al. | |
| 7,030,337 B2 | 4/2006 | Baker et al. | |
| 7,142,115 B2 | 11/2006 | Waters | |
| 7,161,111 B2 | 1/2007 | Schneider | |
| 7,196,283 B2 | 3/2007 | Buchberger et al. | |
| 7,202,440 B2 | 4/2007 | Hewett et al. | |
| 7,220,937 B2 | 5/2007 | Hofman et al. | |
| 7,375,302 B2 | 5/2008 | Twarog et al. | |
| 7,411,149 B2 | 8/2008 | Schneider | |
| 7,423,235 B2 | 9/2008 | Severance, Jr. | |
| 7,598,473 B2 | 10/2009 | Cook et al. | |
| 7,615,720 B2 | 11/2009 | Sanders | |
| 7,622,693 B2 | 11/2009 | Foret | |
| 7,651,269 B2 | 1/2010 | Comendant | |
| 7,671,294 B2 | 3/2010 | Belashchenko et al. | |
| 7,728,401 B2 | 6/2010 | Takatori | |
| 7,755,484 B2 | 7/2010 | Cullen et al. | |
| 7,759,599 B2 | 7/2010 | Hawley et al. | |
| 7,762,869 B2 | 7/2010 | Yoon | |
| 7,927,094 B2 | 4/2011 | Fong et al. | |
| 7,989,727 B2 * | 8/2011 | Twarog | H05H 1/34 |
| | | | 219/121.48 |
| 8,030,592 B2 | 10/2011 | Weidman | |
| 8,035,055 B2 | 10/2011 | Twarog et al. | |
| 8,035,487 B2 | 10/2011 | Malackowski | |
| 8,085,150 B2 | 12/2011 | Oberle | |
| 8,089,025 B2 | 1/2012 | Sanders | |
| 8,097,828 B2 | 1/2012 | Roberts et al. | |
| 8,115,136 B2 | 2/2012 | Mather et al. | |
| 8,141,240 B2 | 3/2012 | Hiew et al. | |
| 8,203,095 B2 | 6/2012 | Storm et al. | |

(56) References Cited

U.S. PATENT DOCUMENTS

| | | | |
|---|---|---|---|
| 8,222,561 B2 * | 7/2012 | Renault | H05H 1/34 219/121.48 |
| 8,242,907 B2 | 8/2012 | Butler et al. | |
| D669,508 S | 10/2012 | Krink et al. | |
| 8,338,740 B2 | 12/2012 | Liebold et al. | |
| 8,373,084 B2 | 2/2013 | Salsich | |
| 8,389,887 B2 | 3/2013 | Liebold et al. | |
| 8,395,076 B2 | 3/2013 | Matus | |
| 8,395,077 B2 | 3/2013 | Duan et al. | |
| 8,455,786 B2 | 6/2013 | Fang | |
| 8,546,719 B2 | 10/2013 | Warren, Jr. et al. | |
| 8,575,510 B2 | 11/2013 | Laurish et al. | |
| 8,581,139 B2 | 11/2013 | Severance, Jr. | |
| 8,620,738 B2 | 12/2013 | Fordyce, III et al. | |
| 8,624,150 B2 | 1/2014 | Simek et al. | |
| 8,633,422 B2 * | 1/2014 | Giese | B23K 9/282 219/137.44 |
| 8,658,941 B2 | 2/2014 | Albrecht | |
| 8,698,036 B1 | 4/2014 | Zhang et al. | |
| 8,698,306 B2 | 4/2014 | Zhang et al. | |
| 8,759,715 B2 | 6/2014 | Narayanan et al. | |
| 8,790,447 B2 | 7/2014 | Bieri et al. | |
| 8,853,588 B2 | 10/2014 | Mao et al. | |
| 8,859,828 B2 | 10/2014 | Liu et al. | |
| 8,921,731 B2 | 12/2014 | Krink et al. | |
| 9,144,882 B2 | 9/2015 | Lindsay et al. | |
| 9,157,360 B2 | 10/2015 | Hoy-Peterson et al. | |
| 9,229,436 B2 | 1/2016 | Stumpfl et al. | |
| 9,233,480 B2 | 1/2016 | Nagai et al. | |
| 9,316,546 B2 | 4/2016 | Tsubaki et al. | |
| 9,395,715 B2 | 7/2016 | Brandt et al. | |
| 9,398,679 B2 | 7/2016 | Namburu | |
| 9,481,050 B2 | 11/2016 | Brine et al. | |
| 9,492,883 B2 | 11/2016 | Mather et al. | |
| 9,550,251 B2 | 1/2017 | Guilotta | |
| 9,609,733 B2 | 3/2017 | Severance | |
| 9,643,273 B2 | 5/2017 | Adams et al. | |
| 9,672,460 B2 | 6/2017 | Hoffa et al. | |
| 9,724,787 B2 | 8/2017 | Becker et al. | |
| 9,737,954 B2 | 8/2017 | Hoffa et al. | |
| 9,781,816 B2 | 10/2017 | Cook et al. | |
| 9,782,852 B2 | 10/2017 | Mao et al. | |
| 9,967,964 B2 | 5/2018 | Kim et al. | |
| 9,981,335 B2 | 5/2018 | Sanders et al. | |
| 9,993,934 B2 | 6/2018 | Vandergon et al. | |
| 10,076,019 B2 * | 9/2018 | Carletti | H05H 1/34 |
| 10,278,274 B2 | 4/2019 | Sanders et al. | |
| 10,314,155 B2 | 6/2019 | Patel et al. | |
| 10,321,551 B2 | 6/2019 | Zhang et al. | |
| 10,335,888 B2 | 7/2019 | Zhang et al. | |
| 10,346,647 B2 | 7/2019 | Hoffa et al. | |
| 10,455,682 B2 | 10/2019 | Shipulski et al. | |
| 10,456,855 B2 | 10/2019 | Sanders et al. | |
| 10,462,891 B2 | 10/2019 | Zhang et al. | |
| 10,486,260 B2 | 11/2019 | Hoffa et al. | |
| 10,555,410 B2 | 2/2020 | Sanders et al. | |
| 10,561,009 B2 | 2/2020 | Sanders et al. | |
| 10,582,605 B2 | 3/2020 | Zhang et al. | |
| 10,609,805 B2 | 3/2020 | Sanders et al. | |
| 10,713,448 B2 | 7/2020 | Hoffa et al. | |
| 10,786,924 B2 | 9/2020 | Vandergon et al. | |
| 10,882,133 B2 * | 1/2021 | Jansma | B23K 9/26 |
| 10,912,183 B2 * | 2/2021 | Zhang | H05H 1/34 |
| 10,960,485 B2 | 3/2021 | Sanders et al. | |
| 11,087,100 B2 | 8/2021 | Hoffa et al. | |
| 11,110,626 B2 | 9/2021 | Vandergon et al. | |
| 11,278,983 B2 | 3/2022 | Sanders et al. | |
| 11,331,743 B2 | 5/2022 | Hoffa et al. | |
| 11,432,393 B2 | 8/2022 | Duan et al. | |
| 11,610,218 B2 | 3/2023 | Young, Jr. et al. | |
| 11,665,807 B2 | 5/2023 | Sanders et al. | |
| 11,684,994 B2 | 6/2023 | Sanders et al. | |
| 11,684,995 B2 | 6/2023 | Zhang et al. | |
| 11,707,860 B2 | 7/2023 | Vandergon et al. | |
| 11,770,891 B2 | 9/2023 | Zhang et al. | |
| 11,783,138 B2 | 10/2023 | Hoffa et al. | |
| 2002/0012756 A1 | 1/2002 | Kuckertz et al. | |
| 2002/0117482 A1 | 8/2002 | Hewett et al. | |
| 2002/0117483 A1 | 8/2002 | Jones et al. | |
| 2002/0117484 A1 | 8/2002 | Jones et al. | |
| 2002/0194064 A1 | 12/2002 | Parry et al. | |
| 2003/0029934 A1 | 2/2003 | Hashish et al. | |
| 2003/0085205 A1 | 5/2003 | Lai et al. | |
| 2003/0148709 A1 | 8/2003 | Anand et al. | |
| 2004/0000538 A1 | 1/2004 | Conway et al. | |
| 2004/0004064 A1 | 1/2004 | Lanouette et al. | |
| 2004/0004113 A1 | 1/2004 | Blankenship | |
| 2004/0173583 A1 | 9/2004 | Iriyama et al. | |
| 2004/0177807 A1 | 9/2004 | Pui et al. | |
| 2004/0193307 A1 | 9/2004 | Fujishima et al. | |
| 2004/0195217 A1 | 10/2004 | Conway et al. | |
| 2004/0200810 A1 | 10/2004 | Brandt et al. | |
| 2005/0035093 A1 | 2/2005 | Yamaguchi | |
| 2005/0045599 A1 | 3/2005 | Matus | |
| 2005/0109736 A1 | 5/2005 | Matus | |
| 2005/0173390 A1 | 8/2005 | Lanouette et al. | |
| 2005/0266777 A1 | 12/2005 | Yoon | |
| 2006/0016789 A1 | 1/2006 | Mackenzie et al. | |
| 2006/0037945 A1 | 2/2006 | Schneider | |
| 2006/0163216 A1 | 7/2006 | Brandt et al. | |
| 2006/0181420 A1 | 8/2006 | Ishii | |
| 2006/0215389 A1 | 9/2006 | Forsbinder et al. | |
| 2006/0289397 A1 | 12/2006 | Mahawill | |
| 2006/0289398 A1 | 12/2006 | Cook et al. | |
| 2006/0289406 A1 | 12/2006 | Helenius et al. | |
| 2007/0044449 A1 | 3/2007 | O'Brien et al. | |
| 2007/0045241 A1 | 3/2007 | Schneider et al. | |
| 2007/0082532 A1 | 4/2007 | Morris | |
| 2007/0082533 A1 | 4/2007 | Currier et al. | |
| 2007/0090168 A1 | 4/2007 | Snow et al. | |
| 2007/0154306 A1 | 7/2007 | Anderson et al. | |
| 2007/0181540 A1 | 8/2007 | Lindsay et al. | |
| 2007/0193988 A1 | 8/2007 | De Joannis et al. | |
| 2007/0210034 A1 | 9/2007 | Mather et al. | |
| 2007/0210035 A1 | 9/2007 | Twarog et al. | |
| 2007/0262060 A1 | 11/2007 | Roberts et al. | |
| 2008/0003353 A1 | 1/2008 | Hardwicke et al. | |
| 2008/0023451 A1 | 1/2008 | Salsich et al. | |
| 2008/0083711 A1 | 4/2008 | Twarog et al. | |
| 2008/0116179 A1 | 5/2008 | Cook et al. | |
| 2008/0118253 A1 | 5/2008 | Abe | |
| 2008/0121624 A1 | 5/2008 | Belashchenko et al. | |
| 2008/0185842 A1 | 8/2008 | Blackman et al. | |
| 2008/0210669 A1 | 9/2008 | Yang et al. | |
| 2008/0217305 A1 | 9/2008 | Sanders | |
| 2008/0237356 A1 | 10/2008 | Singleton et al. | |
| 2008/0297356 A1 | 12/2008 | Oberle | |
| 2008/0308535 A1 | 12/2008 | Rego et al. | |
| 2009/0026180 A1 | 1/2009 | Yang et al. | |
| 2009/0027782 A1 | 1/2009 | Takahashi et al. | |
| 2009/0039178 A1 | 2/2009 | Yoon | |
| 2009/0045174 A1 | 2/2009 | Haberler et al. | |
| 2009/0078196 A1 | 3/2009 | Midorikawa | |
| 2009/0152255 A1 | 6/2009 | Ma et al. | |
| 2009/0159571 A1 | 6/2009 | Salsich | |
| 2009/0159577 A1 | 6/2009 | Sommerfeld | |
| 2009/0170364 A1 | 7/2009 | Scholler et al. | |
| 2009/0175694 A1 | 7/2009 | Craig et al. | |
| 2009/0206722 A1 | 8/2009 | Foret | |
| 2009/0219136 A1 | 9/2009 | Brunet et al. | |
| 2009/0230095 A1 | 9/2009 | Liebold et al. | |
| 2009/0230093 A1 | 9/2009 | Liebold et al. | |
| 2009/0240368 A1 | 9/2009 | Youna, Jr. et al. | |
| 2009/0277882 A1 | 11/2009 | Bornemann | |
| 2009/0294415 A1 | 12/2009 | Salsich et al. | |
| 2009/0312862 A1 | 12/2009 | Fagan | |
| 2010/0046210 A1 | 4/2010 | Mathai et al. | |
| 2010/0078408 A1 | 4/2010 | Liebold et al. | |
| 2010/0084381 A1 | 4/2010 | Indraczek et al. | |
| 2010/0133241 A1 | 6/2010 | Wilhelm et al. | |
| 2010/0264120 A1 | 10/2010 | Reinke et al. | |
| 2010/0314361 A1 | 12/2010 | Buccella | |
| 2011/0029385 A1 | 2/2011 | Engel et al. | |
| 2011/0042358 A1 | 2/2011 | Albanese et al. | |

(56) References Cited

U.S. PATENT DOCUMENTS

| | | |
|---|---|---|
| 2011/0284502 A1 | 11/2011 | Krink et al. |
| 2012/0012560 A1 | 1/2012 | Roberts et al. |
| 2012/0012564 A1 | 1/2012 | Mao et al. |
| 2012/0012565 A1 | 1/2012 | Zhang et al. |
| 2012/0036832 A1 | 2/2012 | Hoy-Petersen et al. |
| 2012/0055907 A1 | 3/2012 | Allimant et al. |
| 2012/0058649 A1 | 3/2012 | Okumura et al. |
| 2012/0060691 A1 | 3/2012 | Bieri et al. |
| 2012/0103946 A1 | 5/2012 | Krink et al. |
| 2012/0139692 A1 | 6/2012 | Neubauer et al. |
| 2012/0152913 A1 | 6/2012 | Mather et al. |
| 2012/0181257 A1 | 7/2012 | Mather et al. |
| 2012/0246922 A1 | 10/2012 | Hussary et al. |
| 2012/0247293 A1 | 10/2012 | Nagai et al. |
| 2012/0248073 A1 | 10/2012 | Conway et al. |
| 2012/0261392 A1 | 10/2012 | Barnett et al. |
| 2013/0001221 A1 | 1/2013 | Lambert |
| 2013/0043222 A1 | 2/2013 | Leiteritz et al. |
| 2013/0043223 A1 | 2/2013 | Leitteritz et al. |
| 2013/0043224 A1 | 2/2013 | Leiteritz et al. |
| 2013/0087535 A1 | 4/2013 | Barnett et al. |
| 2013/0103466 A1 | 4/2013 | Fisher |
| 2013/0126487 A1 | 5/2013 | Crowe |
| 2013/0153545 A1 | 5/2013 | Kim et al. |
| 2013/0163637 A1 | 6/2013 | Parsons et al. |
| 2013/0167697 A1 | 7/2013 | Reukers |
| 2013/0179241 A1 | 7/2013 | Liu |
| 2013/0248497 A1 | 9/2013 | Stoeger et al. |
| 2013/0253728 A1 | 9/2013 | Stumpfl et al. |
| 2013/0263420 A1 | 10/2013 | Shipulski |
| 2014/0021172 A1 | 1/2014 | Sanders et al. |
| 2014/0023856 A1 | 1/2014 | Bisges et al. |
| 2014/0029178 A1 | 1/2014 | Trudeau, Jr. et al. |
| 2014/0061170 A1 | 3/2014 | Lindsay et al. |
| 2014/0069895 A1 | 3/2014 | Brine et al. |
| 2014/0076861 A1 | 3/2014 | Cornelius et al. |
| 2014/0113527 A1 | 4/2014 | Lindsay et al. |
| 2014/0116217 A1 | 5/2014 | Hashish |
| 2014/0165807 A1 | 6/2014 | David et al. |
| 2014/0170935 A1 | 6/2014 | Maurer |
| 2014/0217070 A1 | 8/2014 | Pikus et al. |
| 2014/0235140 A1 | 8/2014 | Maurer |
| 2015/0001193 A1 | 1/2015 | Mao et al. |
| 2015/0021302 A1 | 1/2015 | Zhang et al. |
| 2015/0027998 A1 | 1/2015 | Brine et al. |
| 2015/0076819 A1 | 3/2015 | Mather et al. |
| 2015/0105898 A1 | 4/2015 | Adams et al. |
| 2015/0108223 A1 | 4/2015 | Weitzhandler |
| 2015/0127137 A1 | 5/2015 | Brandt et al. |
| 2015/0129562 A1 | 5/2015 | Severance, Jr. |
| 2015/0181686 A1 | 6/2015 | Schulze et al. |
| 2015/0196989 A1 | 7/2015 | Hashish et al. |
| 2015/0251267 A1 | 9/2015 | Winn et al. |
| 2015/0251331 A1 | 9/2015 | Vandergon et al. |
| 2015/0269603 A1 | 9/2015 | Young, Jr. et al. |
| 2015/0273617 A1 | 10/2015 | Gullotta |
| 2015/0319835 A1 | 11/2015 | Sanders et al. |
| 2015/0319836 A1 | 11/2015 | Sanders |
| 2015/0332071 A1 | 11/2015 | Hoffa et al. |
| 2015/0351213 A1 | 12/2015 | Crowe et al. |
| 2015/0371129 A1 | 12/2015 | Hoffa et al. |
| 2016/0050740 A1 | 2/2016 | Zhang et al. |
| 2016/0120015 A1 | 4/2016 | Crowe |
| 2016/0165711 A1 | 6/2016 | Zhang et al. |
| 2016/0165712 A1 | 6/2016 | Zhang et al. |
| 2016/0174353 A1 | 6/2016 | Mitra et al. |
| 2016/0221108 A1 | 8/2016 | Hoffa et al. |
| 2016/0230763 A1 | 8/2016 | Iqnatiev et al. |
| 2016/0314938 A1 | 10/2016 | Park |
| 2016/0375519 A1 | 12/2016 | Crowe |
| 2017/0042011 A1 | 2/2017 | Sanders et al. |
| 2017/0042012 A1 | 2/2017 | Sanders et al. |
| 2017/0042013 A1 | 2/2017 | Sanders et al. |
| 2017/0046544 A1 | 2/2017 | Ikemoto |
| 2017/0091634 A1 | 3/2017 | Ritter |
| 2017/0124360 A1 | 5/2017 | Young, Jr. et al. |
| 2017/0042014 A1 | 9/2017 | Sanders et al. |
| 2018/0007774 A1 | 1/2018 | Crowe |
| 2018/0099378 A1 | 4/2018 | Hashish et al. |
| 2018/0228013 A1* | 8/2018 | Zhang ............... B23K 10/02 |
| 2018/0232545 A1 | 8/2018 | Hoffa et al. |
| 2018/0250765 A1 | 9/2018 | Sanders et al. |
| 2018/0257164 A1* | 9/2018 | Zhang ............... B23K 10/00 |
| 2018/0257253 A1 | 9/2018 | Vandergon et al. |
| 2019/0261501 A1 | 8/2019 | Zhang et al. |
| 2019/0269002 A1 | 8/2019 | Zhang et al. |
| 2019/0303629 A1 | 10/2019 | Hoffa et al. |
| 2019/0344466 A1 | 11/2019 | Vandergon et al. |
| 2020/0023456 A1 | 1/2020 | Sanders et al. |
| 2020/0055138 A1 | 2/2020 | Hoffa et al. |
| 2020/0070275 A1 | 3/2020 | Sanders et al. |
| 2020/0077504 A1 | 3/2020 | Duan et al. |
| 2020/0196426 A1 | 6/2020 | Sanders et al. |
| 2020/0293727 A1 | 9/2020 | Hoffa et al. |
| 2021/0029814 A1 | 1/2021 | Zhang et al. |
| 2021/0136905 A1* | 5/2021 | Zhang ............... H05H 1/34 |
| 2021/0178505 A1 | 6/2021 | Sanders et al. |
| 2022/0055245 A1 | 2/2022 | Vandergon et al. |
| 2022/0108087 A1 | 4/2022 | Hoffa et al. |
| 2023/0254964 A1 | 8/2023 | Sanders et al. |
| 2023/0271268 A1 | 8/2023 | Zhang et al. |
| 2023/0311359 A1 | 10/2023 | Midura et al. |
| 2023/0419055 A1 | 12/2023 | Hoffa et al. |

FOREIGN PATENT DOCUMENTS

| | | |
|---|---|---|
| CN | 101529999 A | 9/2009 |
| CN | 101554099 A | 10/2009 |
| CN | 101632328 A | 1/2010 |
| CN | 101878677 A | 11/2010 |
| CN | 101992339 A | 3/2011 |
| CN | 103763846 A | 4/2014 |
| CN | 104081882 A | 10/2014 |
| CN | 106180996 A | 12/2016 |
| CN | 106573329 A | 4/2017 |
| CN | 106576418 A | 4/2017 |
| CN | 108136532 A | 6/2018 |
| DE | 2010/000921 U1 | 8/2010 |
| DE | 2020/13010576 U1 | 2/2014 |
| EA | 1829 B1 | 8/2001 |
| EP | 0079019 A | 5/1983 |
| EP | 0242023 A2 | 10/1987 |
| EP | 0591018 A1 | 4/1994 |
| EP | 0875329 A1 | 11/1998 |
| EP | 0941018 A2 | 9/1999 |
| EP | 1006760 A2 | 6/2000 |
| EP | 1117279 A1 | 7/2001 |
| EP | 1893004 A1 | 2/2008 |
| EP | 1988324 A2 | 11/2008 |
| EP | 2 034 805 A2 | 3/2009 |
| EP | 2175702 A1 | 4/2010 |
| EP | 2408274 A2 | 1/2012 |
| FR | 2700982 A1 | 8/1994 |
| FR | 2949938 A1 | 3/2011 |
| JP | 5744467 A | 3/1982 |
| JP | S61-63368 A | 4/1986 |
| JP | S61-195787 A | 8/1986 |
| JP | S63-010082 A | 1/1988 |
| JP | H03-174980 | 7/1991 |
| JP | H03-178980 A | 7/1991 |
| JP | H05-154732 A | 6/1993 |
| JP | H06-262366 A | 9/1994 |
| JP | H07-192892 A | 7/1995 |
| JP | 09063790 A | 3/1997 |
| JP | H10-263833 A | 10/1998 |
| JP | H11-285831 A | 10/1999 |
| JP | 2003-025176 A | 1/2003 |
| JP | 2003-048134 A | 2/2003 |
| JP | 2009-252085 A | 10/2009 |
| JP | 2011/014459 A | 1/2011 |
| JP | 2011-513072 A | 4/2011 |
| JP | 4688450 B2 | 5/2011 |
| JP | 4707108 B2 | 6/2011 |
| JP | 2012-048287 A | 3/2012 |

(56) References Cited

FOREIGN PATENT DOCUMENTS

| | | |
|---|---|---|
| JP | 2012-079221 A | 4/2012 |
| JP | 2015-515381 A | 5/2015 |
| KR | 2018-0040645 A | 4/2018 |
| RU | 2009815 C1 | 3/1994 |
| RU | 2066263 C1 | 9/1996 |
| RU | 95105277 A | 4/1997 |
| RU | 2279341 C2 | 7/2006 |
| RU | 2354460 C1 | 10/2008 |
| RU | 2353485 C1 | 4/2009 |
| RU | 2397848 C2 | 8/2010 |
| RU | 2456780 C2 | 7/2012 |
| RU | 150194 U1 | 7/2014 |
| SU | 1743070 A1 | 6/1994 |
| WO | WO-1993/13905 A1 | 7/1993 |
| WO | WO-96/21339 A1 | 7/1996 |
| WO | WO-99/07193 A1 | 2/1999 |
| WO | WO-2003-041459 A2 | 5/2003 |
| WO | WO 2007-109636 A2 | 9/2007 |
| WO | 2008101226 A1 | 8/2008 |
| WO | WO-03/089183 A1 | 10/2008 |
| WO | WO 2008-150136 A1 | 12/2008 |
| WO | WO 2009-076496 A2 | 6/2009 |
| WO | WO-2009-124941 A2 | 10/2009 |
| WO | WO-2013/103466 A1 | 7/2013 |
| WO | WO-2015-030134 A1 | 3/2015 |
| WO | WO-2015/073522 A1 | 5/2015 |

OTHER PUBLICATIONS

Centricut catalog "2013-2014 Plasma torches and consumables", 68 pages.

Drawing of Hypertherm Part No. 120934, 2000 (redacted).

International Search Report and Written Opinion to corresponding PCT Application No. PCT/US2015/044884. dated Dec. 9, 2015. 15 pages.

Invitation to Pay Additional Fees for corresponding PCT application: PCT/US2015/044884, Sep. 28, 2015, 9 pages.

Komatsu America Industries, LLC: "Next Generation Twister TFP6062-300A Power Supply Units", Retrieved from the internet at: http://www.komatsuplasma.com/kai/ctd/en/tfp6062/pdf/TFP6062_Brochure.pdf, printed Oct. 27, 2016, 2 pages.

Komatsu America Industries, LLC: "TFPL Twister Series", Retrieved from the internet at: http://fineplasma.com/kai/ctd/en/tfp/pdf/eTFP.pdf, printed Oct. 27, 2016, 6 pages.

Thermal Dynamics, "XT-301 Automated Plasma Cutting Torch", retrieved from the internet at: http://victortechnologies.com/IM_Uploads/DocLib_5849_XT-301%20Torch%20for%20use%20w%20Merlin%201000%20Brochure%20(63-2524)_Nov2005.pdf: Thermadyne.

Thermal Dynamics XT™-300 Brochure, May 7, 2007,http://www.mitausteel.lv/wp-content/uploads/2013/11/V-XT300-Torch.pdf, 6 pages.

Trumpf Inc., "TruLaser: Cost-effective cutting through thick and thin", Retrieved from the internet at: http://www.us.trumpf.com/fileadmin/DAM/us.trumpf.com/Brochures/2D_Laser/TruLaser_US_10-12.pdf, printed Oct. 26, 2016, 32 pages.

Welding Magazine, "Plasma cutting system for mild steel", Oct. 2008, p. 34 retrieved from the internet at: http://search.proquest.com/professional/printviewfile?accountid=157282.

Welding Magazine, "Plasma cutting systems and products: new and or upgraded plasma cutting systems and torches have been designed to offer increased flexibility and to boost performance and productivity". Retrieved from the internet at: http://search.proquest.com/professional/printviewfile?accountid=157282, Apr. 2007, pp. 36-38.

* cited by examiner

SWIRL RING AND CONTACT ELEMENT FOR A PLASMA ARC TORCH CARTRIDGE

RELATED APPLICATION

This application is a continuation of U.S. patent application Ser. No. 15/892,687, which was filed on Feb. 9, 2018 and entitled "Swirl Ring and Contact Element for a Plasma Arc Torch Cartridge" which claims the benefit of U.S. Provisional Patent Application No. 62/456,813, which was filed on Feb. 9, 2017 and entitled "Moving Crown for Cartridge," the entire contents of which are incorporated herein by reference in their entirety.

FIELD OF THE INVENTION

The invention relates generally to the field of plasma arc cutting systems and processes. More specifically, the invention relates to improved consumable components (e.g., swirl rings including contact elements) for operating a plasma arc torch.

BACKGROUND

Plasma arc torches are widely used in the cutting and marking of materials. A plasma arc torch generally includes an electrode and a nozzle having a central exit orifice mounted within a torch body, electrical connections, passages for cooling, and passages for arc control fluids (e.g., plasma gas). The torch produces a plasma arc, i.e., a constricted ionized jet of a gas with high temperature and high momentum. Gases used in the torch can be non-reactive (e.g., argon or nitrogen) or reactive (e.g., oxygen or air). During operation, a pilot arc is first generated between the electrode (part of the cathode) and the nozzle (part of the anode). Generation of the pilot arc can be by means of a high frequency, high voltage signal coupled to a DC power supply and the torch or by means of any of a variety of starting methods. Plasma arc torches can utilize cartridges including one or more consumable components (e.g., a nozzle, electrode, and/or a swirl ring) for ease of installation and operation.

FIGS. 1 and 2 show a cartridge for a prior art plasma arc torch 100 having a nozzle 104, a shield 108, an electrode 112, a retaining cap 116, a swirl ring 120, and a fixed "crown" or contact element 124 disposed about the swirl ring 120. This contact element 124 does not move relative to the swirl ring 120, e.g., is fixed in an axial direction relative to the swirl ring 120. The contact element 124 passes a cutting current from a plunger 132 of the plasma arc torch 100 to the electrode 112. Because plasma cutting requires a high cutting current, a solid electrical connection must be maintained between the plasma arc torch 100 and the electrode 112 to ensure proper operation and to limit or eliminate arcing, which can damage equipment and shorten component life.

This "fixed crown" design has a failure mode when the contact element 124 is not in full contact with the plunger 132 (e.g., because the cartridge is not fully tightened within the plasma arc torch 100). In this failure mode, a gap 228 can be created between the contact element 124 and the plunger 132, as shown in FIG. 2. This gap 228 results in a poor electrical connection, and can cause poor performance and component failure. In addition, the poor connection can lead to arcing between the cathode (e.g., the plunger 132) and the contact element 124, which can destroy the entire torch instead of just one or more consumable components. What is needed is a consumable cartridge that avoids this failure mode and ensures proper and complete contact between the plunger 132 and the contact element 124, even if the cartridge is not fully screwed on or is otherwise loose.

SUMMARY OF THE INVENTION

The present invention relates to improved consumables (e.g., plasma arc torch cartridges and swirl rings including contact elements) for plasma arc torches and associated methods of operation. Specifically, the design shown and described above in FIGS. 1-2 is modified such that the "fixed crown" above is replaced by a "floating" contact element, which is a separate piece within the cartridge that is allowed to translate a predetermined distance (e.g., an axial length) within the torch during installation and/or operation in the torch. The contact element can be snap fitted or dropped within a swirl ring or cartridge and confined to a certain region within which there is enough space (or "play") for the contact element to slide freely. In such a configuration, proper and complete contact with the torch cathode can be maintained even if the cartridge is not fully screwed onto the torch (with the torch cathode biasing the contact element axially forward). This configuration protects the torch and ensures that proper electrical contact is maintained within the torch.

For example, one embodiment includes a "snap fit" design that allows the contact element to travel in an axial direction at the fault region during installation in the torch. Thus, instead of being rigidly fixed to the swirl ring, the contact element is located within a track or set of tracks within the swirl ring and is biased by a spring that pushes the contact element toward the torch if there is a gap (e.g., because of an untightened thread). During proper assembly the cathode will push the contact element forward slightly toward the electrode but still maintain a gap for piloting. The gap and the spring being compressed during cutting and arc ignition are a result of gas force in the swirl ring and plenum. This freedom of movement of the contact element ensures proper mating with the cathode through several stages of cartridge turning and installation.

In one aspect, the invention features a consumable cartridge for a plasma arc torch. The consumable cartridge includes a cartridge frame having a first end and a second end opposite the first end. The first and second ends defines a longitudinal axis. The second end includes a plurality of discrete retaining features. The consumable cartridge also includes an electrically conductive contact element secured to the cartridge frame by the plurality of discrete retaining features and is translatable up to a predetermined distance within the cartridge frame along the longitudinal axis at the second end. The contact element has a core, a proximal surface, and a distal surface. The proximal surface is shaped to contact a torch plunger of the plasma arc torch upon installation into the plasma arc torch. The distal surface is shaped to contact an electrode of the plasma arc torch during an operation of the plasma arc torch.

In some embodiments, at least one discrete retaining feature in the plurality of discrete retaining features is configured to engage a switch for sensing a presence of a cartridge frame, cartridge or retaining cap secured to a torch body of the plasma arc torch. In some embodiments, at least one discrete retaining feature in the plurality of discrete retaining features includes a guide track for interfacing with the contact element. In some embodiments, the contact element includes at least one guide channel for interfacing with the at least one discrete retaining feature in the plurality of discrete retaining features. In some embodiments, the plurality of discrete retaining features includes one or more axial stops. In some embodiments, the cartridge frame forms a swirl ring or swirl feature of the plasma arc torch, the first end of the cartridge frame including a set of passages fluidly connecting an internal surface of the cartridge frame and an external surface of the cartridge frame.

In some embodiments, the contact element includes a snap fit feature for coupling to the cartridge frame. In some embodiments, an electrode is disposed within the cartridge frame, the electrode interacting with (e.g., including) a spring configured to bias the contact element toward a cathode of the plasma arc torch. In some embodiments, the contact element is configured to slide along the longitudinal axis during installation in the plasma arc torch upon contact with the torch plunger. In some embodiments, the plurality of discrete retaining features is shaped to matingly engage the contact element and to define a translation path of the contact element within the cartridge frame. In some embodiments, the plurality of discrete retaining features and the contact element define a set of vent passages. In some embodiments, the translation path has two or more radial interface surfaces between the contact element and the cartridge frame.

In some embodiments, the contact element includes scalloped edges. In some embodiments, the contact element includes a cap feature integrally formed with the core. In some embodiments, the cartridge frame is formed of a thermoplastic. In some embodiments, the cartridge frame is molded. In some embodiments, the contact element is physically separate from an electrode within the consumable cartridge. In some embodiments, the contact element is removed from direct physical contact with the electrode when the plasma arc torch is not in operation. In some embodiments, a thickness between the proximal surface and the distal surface is at least double a thickness at a perimeter of the core.

In another aspect, the invention features a swirl ring for a plasma arc torch. The swirl ring includes a body shaped to matingly engage an electrode of the plasma arc torch. The body includes a first end and a second end. The first and second ends define a longitudinal axis. The body also includes a set of protuberances extending from the second end in a direction of the longitudinal axis. At least one protuberance includes an interior guide track. The swirl ring also includes an electrically conductive contact element confined by the set of protuberances. The contact element includes at least one guide channel complementary to the at least one guide track. An alignment of the contact element with the swirl ring is facilitated by an interaction of the at least one guide channel with the at least one guide track.

In some embodiments, the at least one protuberance defines a region that the contact element can occupy during a normal operation of the plasma arc torch. In some embodiments, the first end includes a set of passages fluidly connecting an internal surface of the swirl ring and an external surface of the swirl ring. In some embodiments, the contact element includes a snap fit feature for coupling to the body of the swirl ring. In some embodiments, the electrode interacts with or includes a spring configured to bias the contact element toward a cathode of the plasma arc torch. In some embodiments, the contact element is configured to slide along the longitudinal axis during installation in the plasma arc torch upon contact with a plunger of the plasma arc torch. In some embodiments, one or more protuberances has a linear height of between approximately 5 and 7 millimeters. In some embodiments, one or more protuberances has a linear width of between approximately 1 and 3 millimeters. In some embodiments, one or more protuberances has a linear length of between approximately 6 and 8 millimeters.

In some embodiments, the set of protuberances defines a translation path for the contact element. In some embodiments, the swirl ring and the contact element define a set of vent passages. In some embodiments, the translation path has two or more radial interface surfaces between the contact element and the swirl ring. In some embodiments, the contact element includes scalloped edges. In some embodiments, the contact element has a substantially uniform cross-sectional thickness. In some embodiments, the swirl ring is formed of a thermoplastic. In some embodiments, the swirl ring is molded. In some embodiments, the contact element is removed from direct physical contact with the electrode when the plasma arc torch is not in operation.

In another aspect, the invention features a swirl ring for a plasma arc torch. The swirl ring includes a body configured to at least partially surround and slidingly engage an electrode of the plasma arc torch. The body includes a first end and a second end opposite the first end. The first and second ends define a longitudinal axis. The body also includes a set of protuberances extending from the second end in a direction of the longitudinal axis. At least one of protuberances is configured to engage a switch for sensing a presence of a swirl ring or a retaining cap of the plasma arc torch. In some embodiments, a set of molded swirl holes is integrally formed within the body of the swirl ring. In some embodiments, the swirl ring includes a crimped on, unitary nozzle. In some embodiments, the swirl ring includes an electrically conductive contact element confined within the set of protuberances, wherein the set of protuberances includes a set of guide tracks and the contact element includes a set of guide channels complementary to the set of guide tracks. In some embodiments, the set of protuberances includes a retaining feature to confine the contact element.

In another aspect, the invention features a consumable cartridge for a plasma arc torch. The consumable cartridge includes a cartridge frame and an electrically conductive contact element confined by the cartridge frame. The consumable cartridge further includes means for locking the contact element into the plasma arc torch during an operation of the plasma arc torch. In another aspect, the invention features a consumable cartridge for a plasma arc torch. The consumable cartridge includes a cartridge frame. The consumable cartridge (e.g., the frame) further includes means for engaging a consumable sense feature of the plasma arc torch during the operation of the plasma arc torch.

In another aspect, the invention features a method of operation of a plasma arc torch. The method includes installing a consumable cartridge in the plasma arc torch. The consumable cartridge has a cartridge frame with a first end and a second end that define a longitudinal axis. The consumable cartridge includes an electrically conductive contact element confined by the cartridge frame. The method also includes translating the contact element in a first direction along the longitudinal axis toward the first end once contact is made with a torch plunger of the plasma arc torch. The method also includes translating an electrode of the plasma arc torch in a second direction opposite the first direction along the longitudinal axis. The electrode contacts the contact element during a plasma operation (e.g., cutting or gouging) of the plasma arc torch. The contact element is separated from the electrode when the plasma arc torch is not performing the plasma operation.

In another aspect, the invention features a method of assembling a plasma arc torch cartridge. The method includes providing a swirl ring having body shaped to matingly engage an electrode of a plasma arc torch. The body includes a first end and a second end that define a longitudinal axis. The body also includes a set of protuberances extending from the second end along a direction of the longitudinal axis. The set of protuberances includes a set of guide tracks. The method also includes providing an electrically conductive contact element having a set of guide channels complementary to the set of guide tracks of the swirl ring. The method also includes installing the contact element in the swirl ring, the guide channels of the contact element matingly engaging the set of guide tracks of the swirl ring. During installation of the contact element into the swirl ring, the contact element translates a fixed distance along the longitudinal axis within the swirl ring until the nozzle is attached to the first end of the swirl ring. After installation, the contact element is held securely within the plasma arc torch cartridge (e.g., confined within a region, but free to move in an axial direction within the region). In some embodiments, after installation the contact element is able to translate a fixed distance within the plasma arc torch cartridge along the longitudinal axis. In some embodiments, the translation of the contact element in a direction of the second end is limited by at least one retaining feature disposed on an interior surface of at least one of the protuberances.

In another aspect, the invention features a consumable cartridge for a plasma arc torch. The consumable cartridge includes a body configured to at least partially surround and slidingly engage an electrode of the plasma arc torch. The body includes a distal first end and a proximal second end opposite the first end. The first and second ends defining a longitudinal axis. The consumable cartridge also includes an intermediate component configured to be positioned between the body and a safety switch of the plasma arc torch, the intermediate component including at least one discrete protuberance affixed to a proximal end of the intermediate component, the discrete protuberance extending from the proximal end of the intermediate component in a direction of the longitudinal axis. The at least one discrete protuberance is configured to enable an operation of the plasma arc torch by sensing a presence of a consumable (e.g., swirl ring or retaining cap) of the plasma arc torch by the safety switch. In another aspect, the invention features a method of enabling an operation of a plasma arc cutting torch. The method includes providing a protuberance on a body of a torch cartridge. The method also includes installing the torch cartridge in a plasma arc torch, the protuberance activating a safety switch for sensing a presence of a consumable (e.g., swirl ring or retaining cap) of the plasma arc torch.

In some embodiments, the cartridge includes a spring electrode having a "floating crown" that is located dynamically within the swirl ring of the cartridge. In some embodiments, when not in operation, the floating crown is not in direct physical contact with the electrode (e.g., is contacting only the spring connecting the two). In some embodiments, the swirl ring and the floating crown include complementary tracks or guides. In some embodiments, the floating crown has a non-circular shape with a number of tabs and/or slots that would be expensive and/or difficult to machine. In some embodiments, an additional set of alignment surfaces influences electrical contacts within the torch (in certain previous embodiments, the electrode, the contact element, and the plunger provided such surfaces, whereas here the swirl ring also provides such surfaces). In some embodiments, as installation occurs, the crown translates axially forward once contact is made with the torch plunger, and then when firing the electrode translates back into the floating crown to fire. In some embodiments, one or more configurations described herein result in improved consumable alignment. In some embodiments, one or more configurations described herein provide more reliable contact or connection between the plunger and the electrode, even during incomplete installation, which enables faster consumable changes and reduction in cost.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 2:
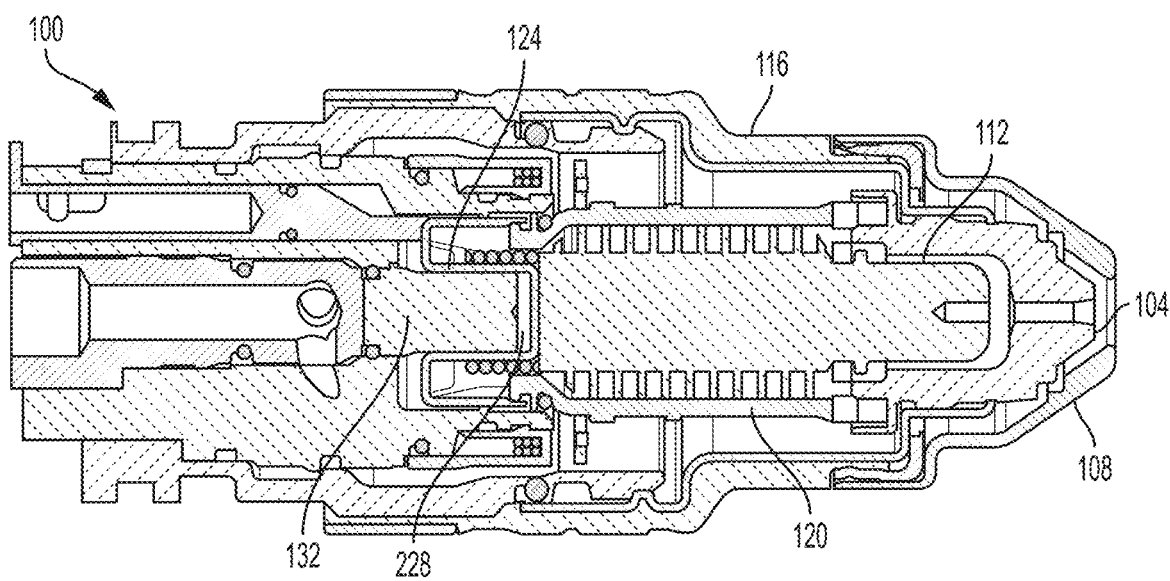
FIG. 2 is a cross-sectional view of a prior art plasma arc torch with an improperly installed "fixed crown" cartridge.
Figure 3:
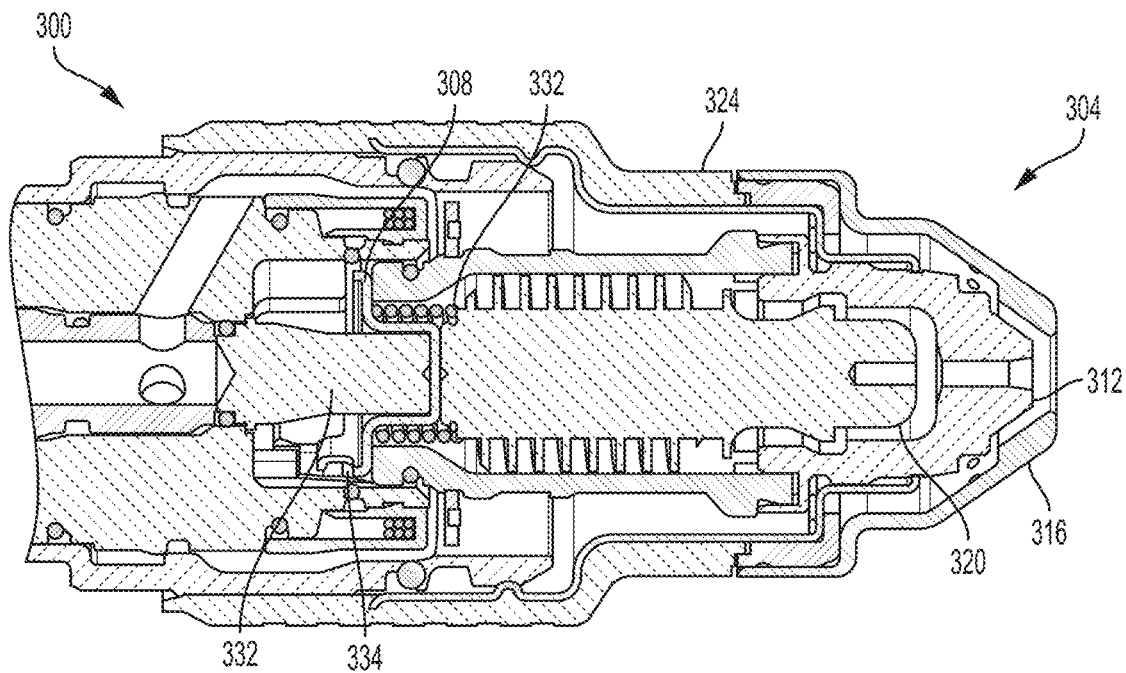
FIG. 3 is a cross-sectional view of a plasma arc torch with a cartridge including a "floating crown" or contact element installed therein, according to an illustrative embodiment of the invention.

FIG. 3 is a cross-sectional view of a plasma arc torch 300 with a cartridge 304 including a "floating crown" or electrically conductive contact element 308 installed therein, according to an illustrative embodiment of the invention. The plasma arc torch 300 has a nozzle 312, a shield 316, an electrode 320, a retaining cap 324, and a swirl ring 328. The contact element 308 installed in the plasma arc torch 300 includes a spring 332 of the electrode 320 configured to bias the contact element 308 axially backward toward the plunger (cathode) 332. During proper assembly, the cathode 332 will push the contact element 308 slightly forward toward the electrode 320 but still maintain a gap between the electrode 320 and the contact element 308 for piloting and arc generation during a beginning of operation. During cutting and/or arc ignition, this gap and the spring will be fully compressed as a result of gas forces within the swirl ring 328 (and/or plenum). In contrast to the prior art embodiment shown in FIGS. 1 and 2, this freedom of movement of the contact element 308 ensures proper mating with the cathode 332 through several stages of cartridge turning and installation.

Figures 4A, 4B:
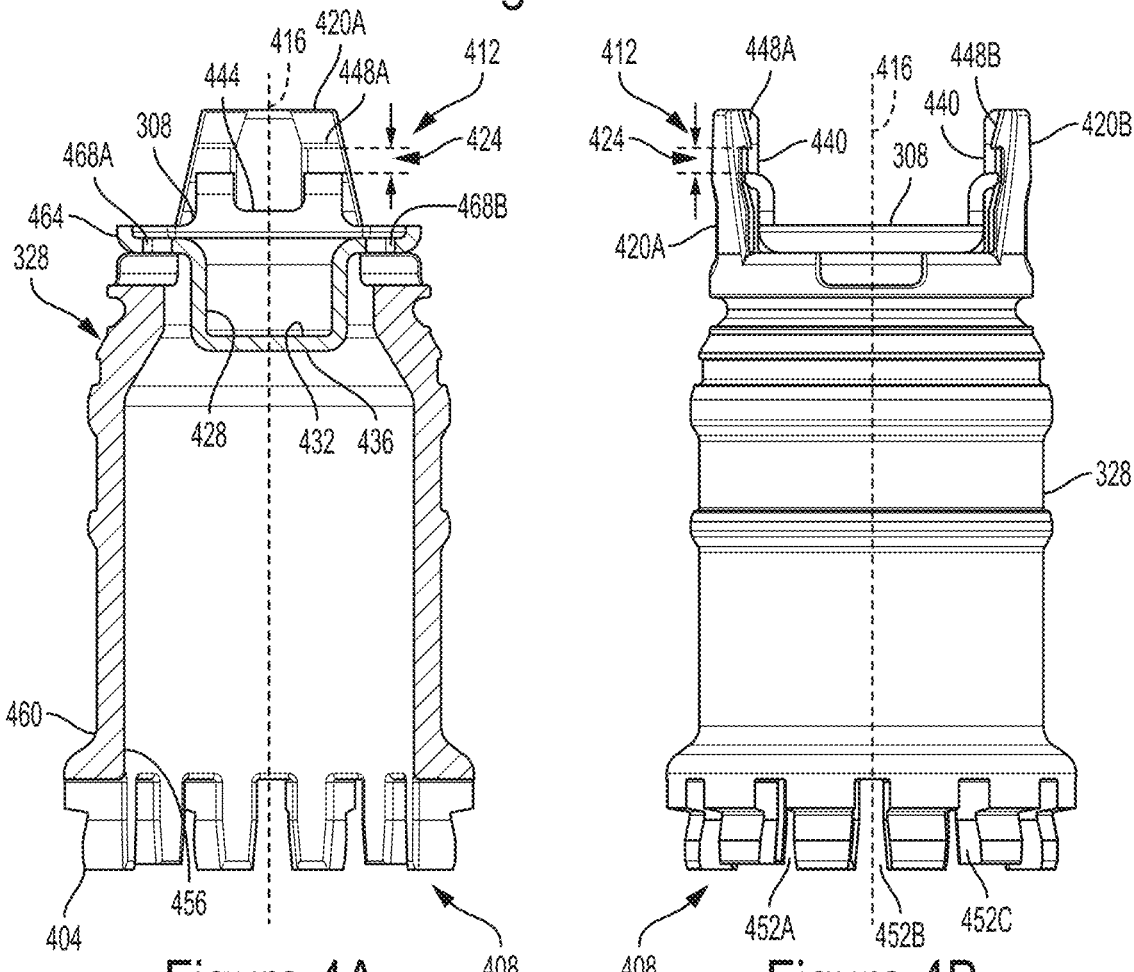
FIG. 4A is a cross-sectional view of a swirl ring having a "floating crown" or contact element installed therein, according to an illustrative embodiment of the invention.
FIG. 4B is a side view of the swirl ring of FIG. 4A rotated 90 degrees about a longitudinal axis of the swirl ring, according to an illustrative embodiment of the invention.

FIG. 4A is a cross-sectional view of the swirl ring 328 (e.g., a consumable cartridge for a plasma arc torch) having a "floating crown" or electrically conductive contact element 308 installed therein, according to an illustrative embodiment of the invention, and FIG. 4B is a side view of the swirl ring of FIG. 4A rotated 90 degrees about a longitudinal axis 404 of the swirl ring 328. The swirl ring 328 has a body 404 (e.g., a cartridge frame) having a first end 408 and a second end 412 opposite the first end 408, the first and second ends defining a longitudinal axis 416. The second end 412 includes a plurality of discrete retaining features 420A, 420B. The discrete retaining features 420A, 420B can be protuberances that take the shape of projections, distensions or longitudinal extensions at the second end 412. In this embodiment, there are two retaining features 420A, 420B that are diametrically opposed, but in other embodiments there are another number of discrete retaining features, including three, four, or a different number.

The contact element 308 is secured to the body 404 by the plurality of discrete retaining features 420A, 420B. The contact element 308 has a core 428, a proximal surface 432, and a distal surface 436. The proximal surface 432 is shaped to contact a torch plunger (e.g., the cathode 332 shown and described in FIG. 3) of the plasma arc torch upon installation into the plasma arc torch. The distal surface 436 is shaped to contact an electrode (e.g., the electrode 320 shown and described in FIG. 3) of the plasma arc torch during an operation of the plasma arc torch. The contact element 308 is physically separate from the electrode 320 and is removed from direct physical contact with the electrode 320 when the plasma arc torch 300 is not in operation. The contact element 308 is translatable up to a predetermined distance 424 within the body 404 along the longitudinal axis 416 at the second end 412. The contact element 308 can be manufactured from brass, copper, and/or another conductive material.

At least one discrete retaining feature (or protuberance) in the plurality of discrete retaining features 420A, 420B can include a means for engaging a consumable sense feature of the plasma arc torch (e.g., a switch 334) during operation of the plasma arc torch. The consumable sense feature can be for sensing a presence of a consumable (e.g., the retaining cap 324) secured to a torch body of the plasma arc torch, as shown in FIG. 3. In addition, at least one discrete retaining feature in the plurality of discrete retaining features 420A, 420B (as shown, each discrete retaining feature) includes a guide track 440 for interfacing with the contact element 308. The contact element 308 includes at least one complementary guide channel 444 for interfacing with the at least one discrete retaining feature in the plurality of discrete retaining features 420A, 420B. In some embodiments, the plurality of discrete retaining features 420A, 420B can include one or more axial stops 448A, 448B (or "lip" features) that serve, e.g., as a means for locking the contact element 308 into the cartridge. The plurality of discrete retaining features 420A, 420B is shaped to matingly engage the contact element 308 and to define a translation path of the contact element 308 within the body (e.g., corresponding to the predetermined distance 424). The translation path has two or more radial interface surfaces between the contact element 308 and the body 404.

The body 404 can form a swirl ring or swirl feature of the plasma arc torch. The first end of the body 404 includes a set of passages (e.g., passages 452A, 452B, 452C, etc.) fluidly connecting an internal surface 456 of the body 404 and an external surface 460 of the body 404. The contact element 308 can include a snap fit feature 464 for coupling to the body 404. The contact element 308 can be configured to slide along the longitudinal axis 416 during installation in the plasma arc torch upon contact with the torch plunger 332. The plurality of discrete retaining features 420A, 420B and the contact element 308 define a set of vent passages 468A, 468B. In some embodiments, the contact element includes a "cap" feature integrally formed with the core (e.g., as shown below in FIG. 6A). In some embodiments, the contact element 308 includes scalloped edges (e.g., as shown below in FIG. 6B). In some embodiments, the body 404 is formed of a thermoplastic and/or is molded.

Figure 1:
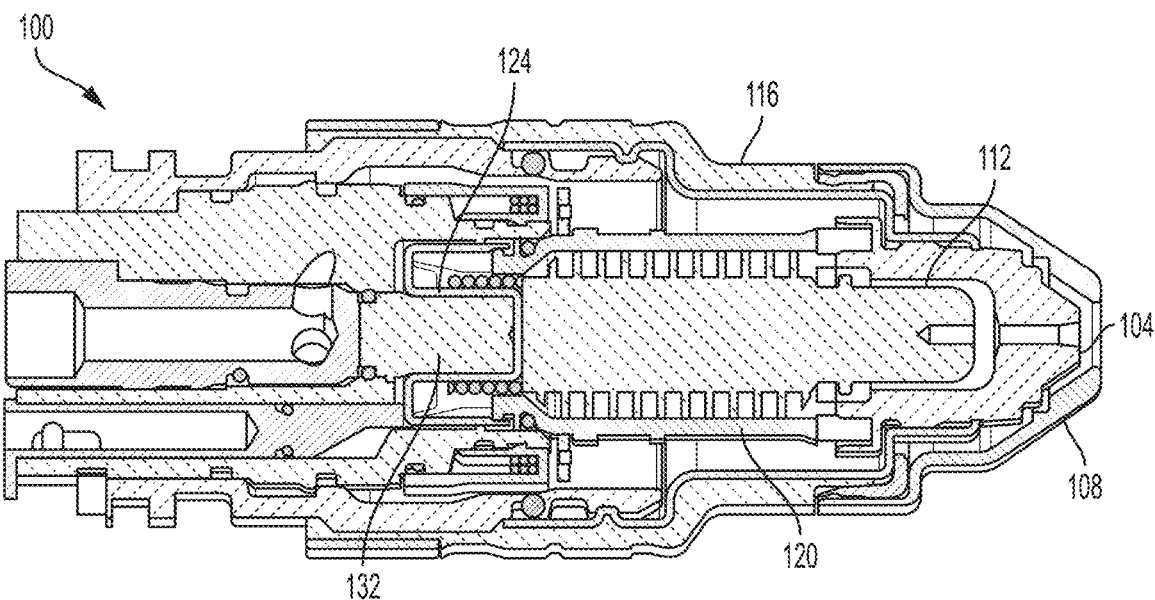
FIG. 1 is a cross-sectional view of a prior art plasma arc torch with a properly installed "fixed crown" cartridge.

The embodiment of the invention shown in FIGS. 3 and 4A-4B has been tested in comparison to the "fixed crown" cartridge design of FIGS. 1 and 2. During testing, the cartridge thread for each setup was left slightly untightened to generate a gap of roughly 0.040 inches. Each system was run in gouging mode, which provides a lower gas pressure and a higher risk of arcing. For the "fixed crown" cartridge design of FIGS. 1 and 2, two test cases out of twelve failed, and in one of those two test cases, the torch was completely burned or destroyed. By comparison, when the same tests were run with the "floating crown" embodiment shown in FIGS. 3 and 4A-4B, the torch passed the test every time without any damage, showing that the embodiment of FIGS. 3 and 4A-4B provides a more robust torch and consumable design.

Figure 5A:
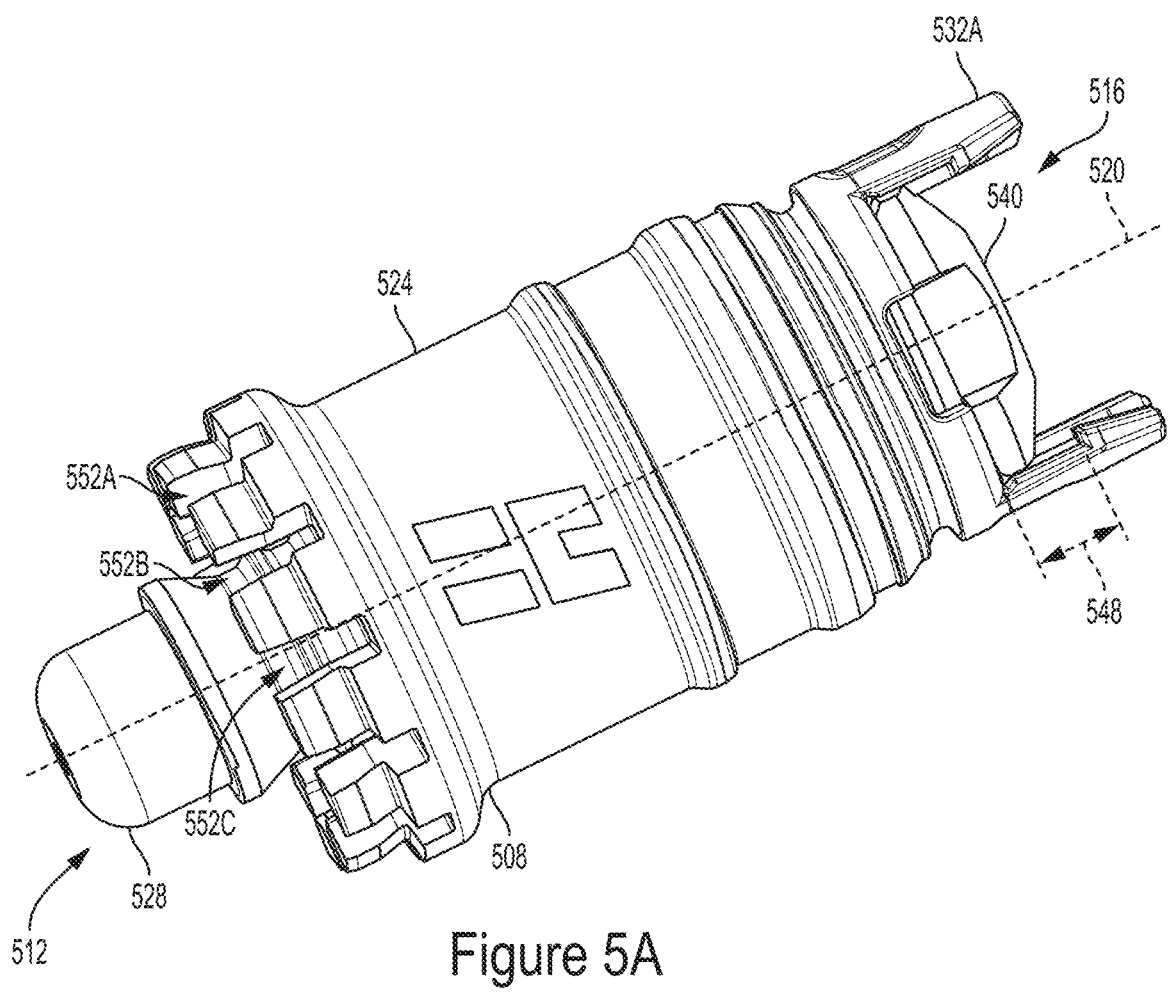
FIG. 5A is a side view of a plasma arc torch cartridge having an electrode and a contact element installed therein, according to an illustrative embodiment of the invention.
Figure 5B:
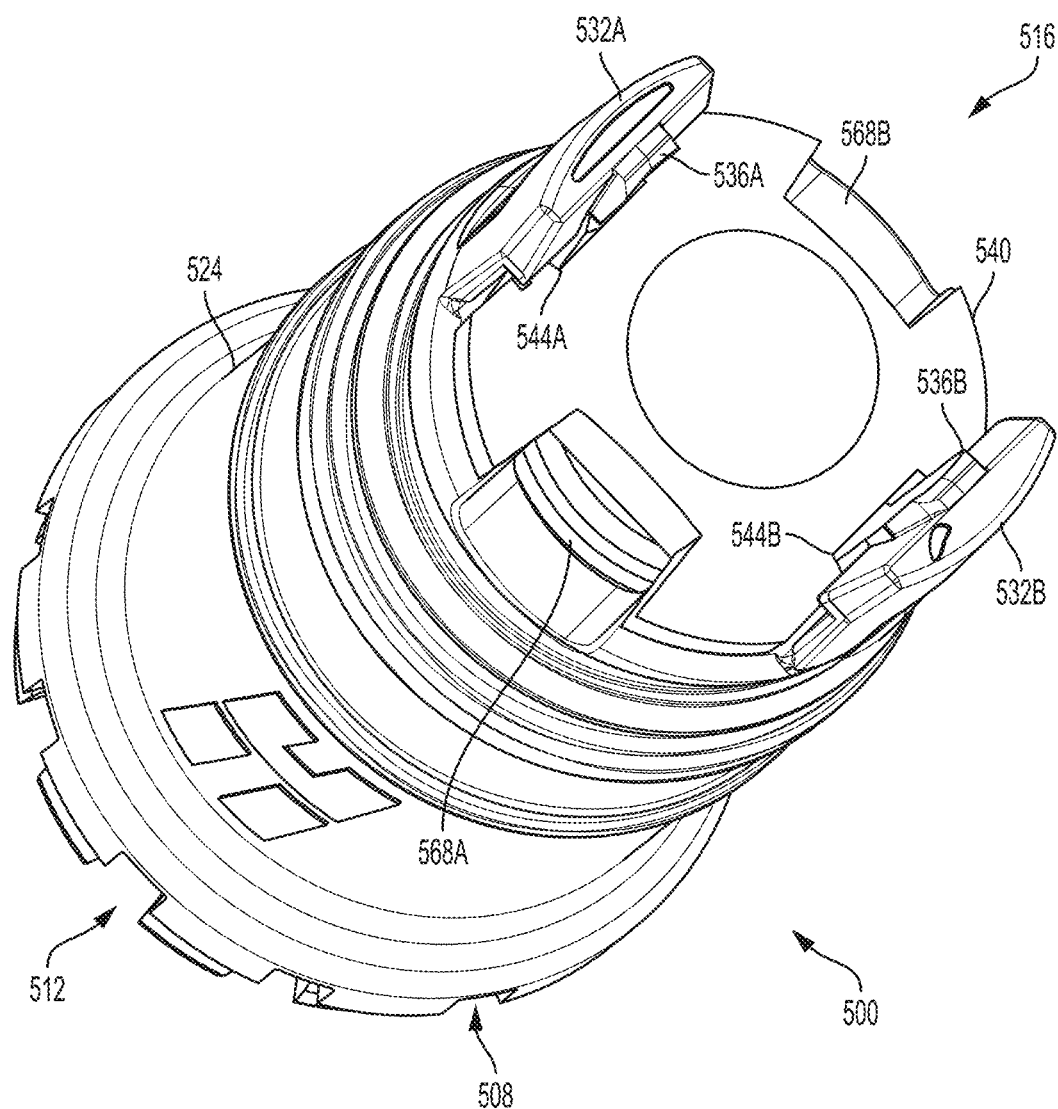
FIG. 5B is a top view of the plasma arc torch cartridge of FIG. 5A, according to an illustrative embodiment of the invention.
Figure 5C:
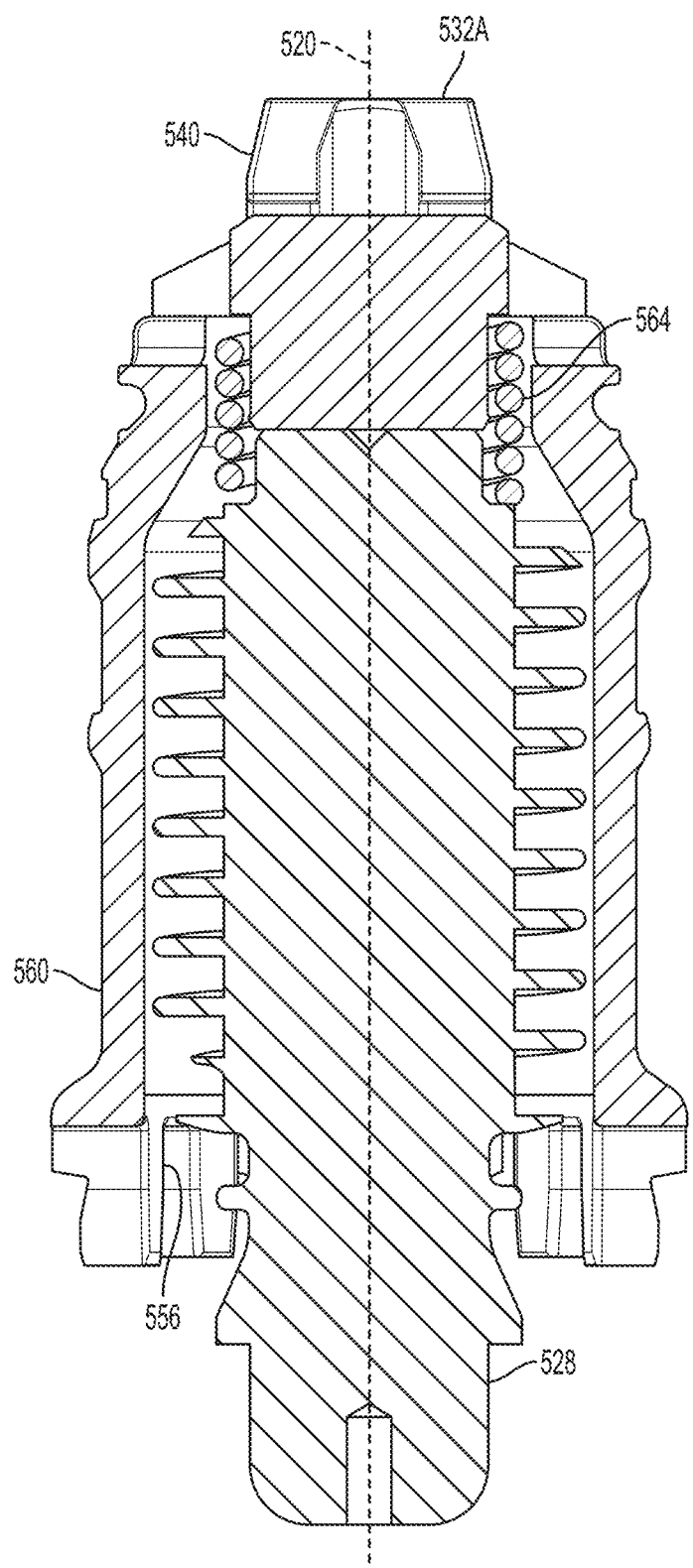
FIG. 5C is a sectional view of the plasma arc torch cartridge of FIG. 5A, according to an illustrative embodiment of the invention.
Figure 5D:
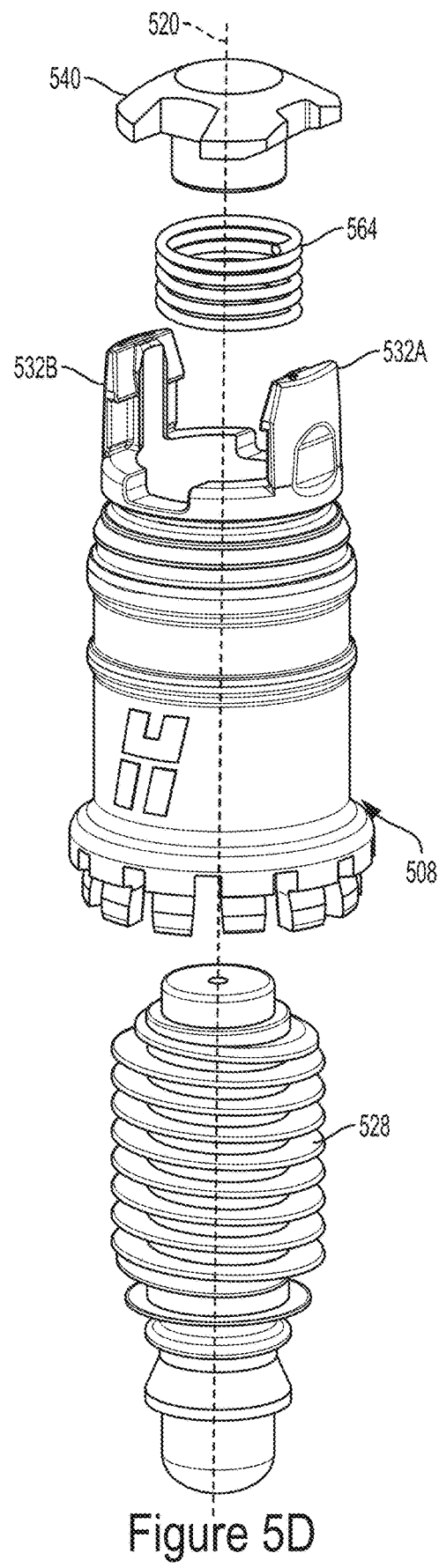
FIG. 5D is an exploded view of the plasma arc torch cartridge of FIG. 5A, according to an illustrative embodiment of the invention.

FIGS. 5A-5D show various views of another consumable cartridge 500 for a plasma arc torch having a contact element 540 installed therein, according to another illustrative embodiment of the invention (FIG. 5A shows a side view; FIG. 5B shows a top view; FIG. 5C shows a sectional view; FIG. 5D shows an exploded view). Elements of this consumable cartridge 500 can be substantially similar to those shown and described above in FIGS. 4A-4B. The consumable cartridge 500 includes a swirl ring 508 having a body 524. The body includes a first end 512 and a second end 516 opposite the first end 512, the first and second ends 512, 516 defining a longitudinal axis 520. The body 524 is shaped to matingly engage an electrode 528 of the plasma arc torch. The body 524 includes a set of protuberances 532A, 532B extending from the second end 516 in a direction of the longitudinal axis 520. At least one protuberance 532A, 532B includes an interior guide track 536A, 536B. The swirl ring 508 also includes an electrically conductive contact element 540 confined by the set of protuberances 532A, 532B. The contact element 540 includes at least one guide channel 544A, 544B complementary to the at least one guide track 536A, 536B. Alignment of the contact element 540 with the swirl ring 508 is facilitated by an interaction of the at least one guide channel 544A, 544B with the at least one guide track 536A, 536B.

At least one protuberance 532A, 532B defines a region 548 that the contact element 540 can occupy during normal operation of the plasma arc torch. The first end 512 includes a set of passages (e.g., 552A, 552B, 552C, and similar passages) fluidly connecting an internal surface 556 of the swirl ring 508 and an external surface 560 of the swirl ring 508. The contact element 540 can include a snap fit feature for coupling to the body of the swirl ring 508 (e.g., it can snap within the protuberances and be retained within the consumable cartridge 500 by the same). The electrode 528 includes a spring 564 configured to bias the contact element 540 toward a cathode of the plasma arc torch. The contact element 540 is configured to slide along the longitudinal axis 520 during installation in the plasma arc torch upon contact with a plunger of the plasma arc torch. The set of protuberances 532A, 532B defines a translation path (e.g., within and confined to the region 548) for the contact element 540. The set of protuberances 532A, 532B and the contact element 540 define a set of vent passages 568A, 568B. The translation path has two or more radial interface surfaces 572A, 572B between the contact element 540 and the swirl ring 508. In some embodiments, one or more protuberances in the set of protuberances 532A, 532B can have one or more of the following linear dimensions: a height (e.g., in a direction of the longitudinal axis) of approximately 6.3 millimeters, or optionally between approximately 6.1 and 6.5 millimeters, or optionally between approximately 5 and 7 millimeters; a width (e.g., in a direction of a radius of the consumable cartridge) of approximately 2.0 millimeters, or optionally between approximately 1.8 and 2.2 millimeters, or optionally between approximately 1 and 3 millimeters; and/or a length (e.g., in a direction perpendicular to both the width and the height) of approximately 6.9 millimeters, or optionally between approximately 6.7 and 7.1 millimeters, or optionally between approximately 6 and 8 millimeters.

Figure 6A:
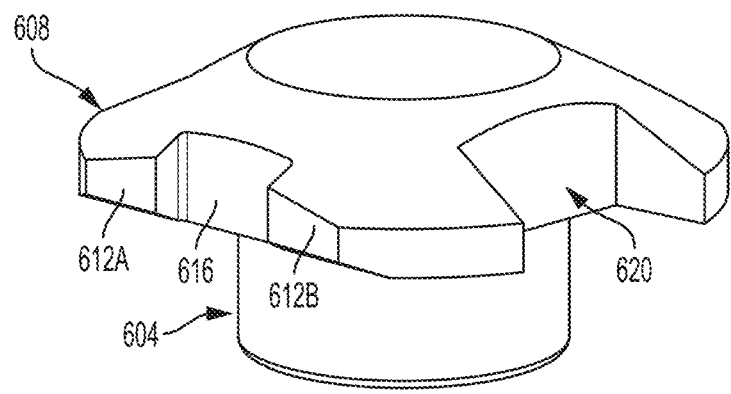
FIG. 6A is a perspective view of the contact element for a plasma arc torch cartridge shown in FIGS. 5A-5D, according to an illustrative embodiment of the invention.
Figure 6B:
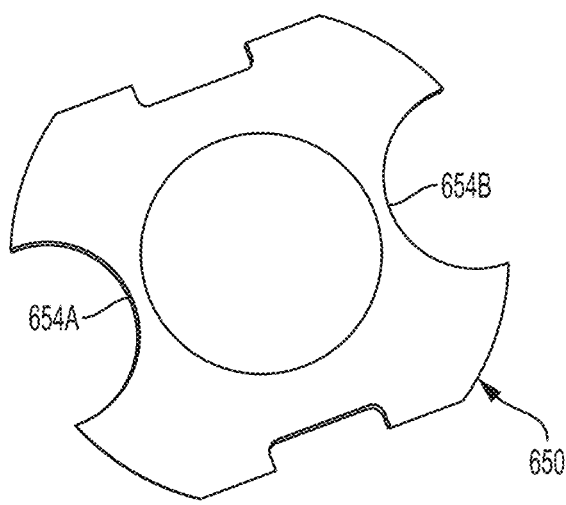
FIG. 6B is a top view of a contact element for a plasma arc torch cartridge having scalloped edges, according to an illustrative embodiment of the invention.

FIG. 6A is a perspective view of the contact element 540 for a plasma arc torch cartridge shown in FIGS. 5A-5D, according to an illustrative embodiment of the invention. This contact element 540 is electrically conductive. The contact element 540 has a core 604 (e.g., a solid core or a hollow core) and a cap 608. The cap 608 includes one or more locating surfaces 612A, 612B for aligning with a swirl ring (e.g., swirl ring 508) of a plasma arc torch cartridge and one or more channels 616 for interlocking with complementary protuberances of a swirl ring. The contact element 540 has one or more further channels 620 for defining a set of vent passages when engaged with one or more protuberances of a swirl ring. The contact element 540 can have a similar set of features on an opposing end (e.g., 180 degrees away from) of the contact element 540 for each of the one or more channels 616 and the further channel 620 (both not shown). FIG. 6B shows a similar contact element 650 with some differences. One notable difference is that the channels 654A, 654B for forming the vent passages have scalloped edges, rather than square or angular edges. One of ordinary skill in the art will readily appreciate that other shapes and configurations are also possible.

Figure 7:
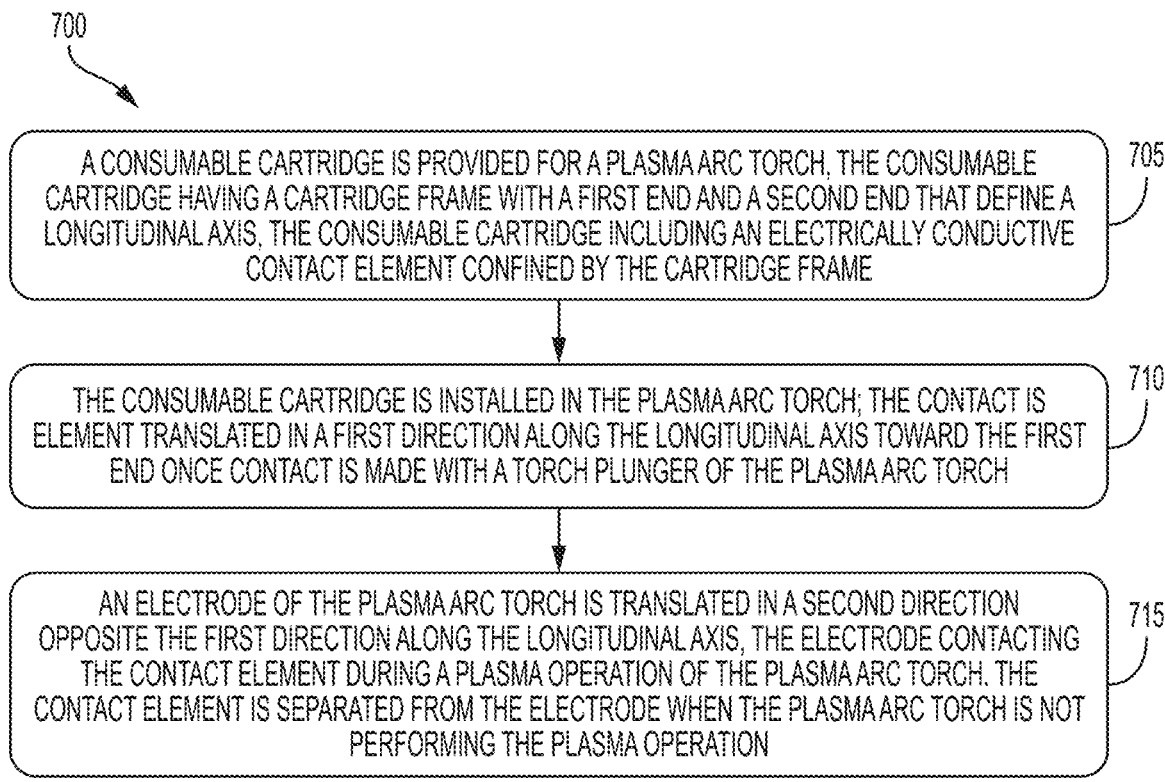
FIG. 7 is a flow diagram illustrating a method of operation of a plasma arc torch, according to an illustrative embodiment of the invention.

FIG. 7 is a flow diagram illustrating a method 700 of operation of a plasma arc torch, according to an illustrative embodiment of the invention. In a first step 705, a consumable cartridge is provided for the plasma arc torch, the consumable cartridge having a cartridge frame with a first end and a second end that define a longitudinal axis, the consumable cartridge including an electrically conductive contact element confined by the cartridge frame. In a second step 710, the consumable cartridge is installed in the plasma arc torch, the contact element translated in a first direction along the longitudinal axis toward the first end once contact is made with a torch plunger of the plasma arc torch. In a third step 715, an electrode of the plasma arc torch is translated in a second direction opposite the first direction along the longitudinal axis, the electrode contacting the contact element during a cutting operation of the plasma arc torch. The contact element is separated from the electrode when the plasma arc torch is not performing the cutting operation.

Figure 8:
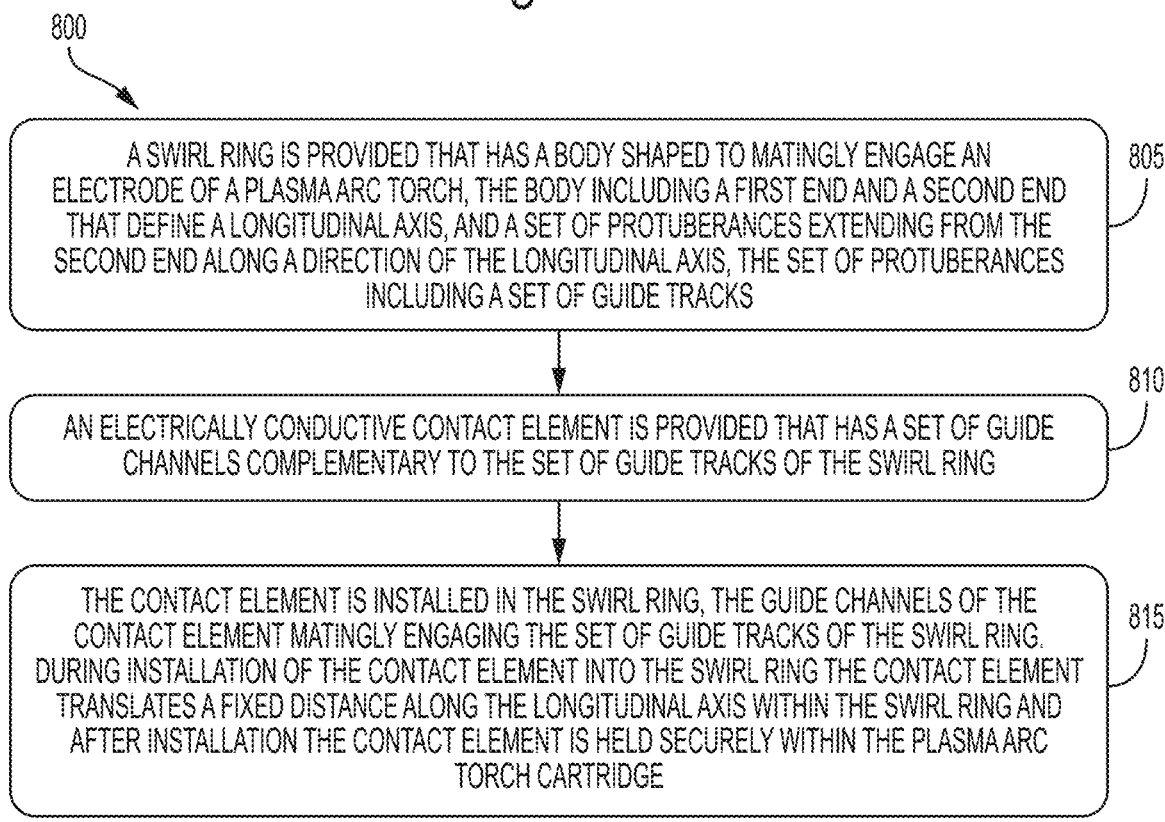
FIG. 8 is a flow diagram illustrating a method of assembling a plasma arc torch cartridge, according to an illustrative embodiment of the invention.

FIG. 8 is a flow diagram illustrating a method 800 of assembling a plasma arc torch cartridge, according to an illustrative embodiment of the invention. In a first step 805, a swirl ring is provided that has a body shaped to matingly engage an electrode of a plasma arc torch, the body including a first end and a second end that define a longitudinal axis, and a set of protuberances extending from the second end along a direction of the longitudinal axis, the set of protuberances including a set of guide tracks. In a second step 810, an electrically conductive contact element is provided that has a set of guide channels complementary to the set of guide tracks of the swirl ring. In a third step 815, the contact element is installed in the swirl ring, the guide channels of the contact element matingly engaging the set of guide tracks of the swirl ring. During installation of the contact element into the swirl ring the contact element translates a fixed distance along the longitudinal axis within the swirl ring, and wherein after installation the contact element is held securely within the plasma arc torch cartridge. In some embodiments, after installation the contact element is able to translate a fixed distance within the plasma arc torch cartridge along the longitudinal axis. In some embodiments, the translation of the contact element in a direction of the second end is limited by at least one retaining feature disposed on an interior surface of at least one of the protuberances.

While the invention has been particularly shown and described with reference to specific preferred embodiments, it should be understood by those skilled in the art that various changes in from and detail may be made therein without departing from the spirit and scope of the invention as defined by the following claims.

What is claimed is:

1. A consumable cartridge for a plasma arc torch, the consumable cartridge comprising:
   a cartridge frame having a first end and a second end opposite the first end, the first and second ends defining a longitudinal axis, the second end including a plurality of discrete retaining features, the discrete retaining features defining at least one protuberance, the at least one protuberance including at least one interior guide track; and
   an electrically conductive contact element secured to the cartridge frame by the plurality of discrete retaining features, the contact element having a core, a proximal surface, and a distal surface,
   wherein the contact element is disposed at least partially between a torch plunger of the plasma arc torch and an electrode of the plasma arc torch upon installation into the plasma arc torch, and
   wherein at least one discrete retaining feature in the plurality of discrete retaining features is configured to engage a switch for sensing a presence of the cartridge frame or the consumable cartridge secured to a torch body of the plasma arc torch.

2. The consumable cartridge of claim 1 wherein the contact element is configured to translate toward (i) a proximal end of the torch plunger of the plasma arc torch upon installation into the plasma arc torch, and (ii) the electrode of the plasma arc torch during an operation of the plasma arc torch.

3. The consumable cartridge of claim 1 wherein the contact element matingly engages the at least one guide track of the protuberance and is freely translatable up to a predetermined distance within the plurality of discrete retaining features of the cartridge frame along the longitudinal axis at the second end.

4. The consumable cartridge of claim 1 wherein the at least one protuberance is a projection or distension configured to enable an operation of the plasma arc torch.

5. The consumable cartridge of claim 1 wherein the at least one protuberance has a linear width of between approximately 1 and 3 millimeters.

6. The consumable cartridge of claim 1 wherein the contact element includes at least one guide channel for interfacing with at least one discrete retaining feature in the plurality of discrete retaining features.

7. The consumable cartridge of claim 1 wherein the plurality of discrete retaining features includes one or more axial stops.

8. The consumable cartridge of claim 1 wherein the cartridge frame forms a swirl ring or swirl feature of the plasma arc torch, the first end of the cartridge frame including a set of passages fluidly connecting an internal surface of the cartridge frame and an external surface of the cartridge frame.

9. The consumable cartridge of claim 1 wherein the contact element includes a snap fit feature for coupling to the cartridge frame.

10. The consumable cartridge of claim 1 further including an electrode disposed within the cartridge frame, the electrode interacting with a spring configured to bias the contact element toward a cathode of the plasma arc torch.

11. The consumable cartridge of claim 1 wherein the contact element is configured to slide along the longitudinal axis during installation in the plasma arc torch upon contact with the torch plunger.

12. The consumable cartridge of claim 1 wherein the plurality of discrete retaining features is shaped to matingly engage the contact element and to define a translation path of the contact element within the cartridge frame.

13. The consumable cartridge of claim 12 wherein the plurality of discrete retaining features and the contact element define a set of vent passages.

14. The consumable cartridge of claim 12 wherein the translation path has two or more radial interface surfaces between the contact element and the cartridge frame.

15. The consumable cartridge of claim 1 wherein the contact element includes scalloped edges.

16. The consumable cartridge of claim 1 wherein the contact element includes a cap feature integrally formed with the core.

17. The consumable cartridge of claim 1 wherein the cartridge frame is formed of a thermoplastic.

18. The consumable cartridge of claim 1 wherein the cartridge frame is molded.

19. The consumable cartridge of claim 1 wherein the contact element is physically separate from an electrode within the consumable cartridge.

20. The consumable cartridge of claim 1 wherein the contact element is removed from direct physical contact with the electrode when the plasma arc torch is not in operation.

21. The consumable cartridge of claim 1 wherein a thickness between the proximal surface and the distal surface is at least double a thickness at a perimeter of the core.

22. The consumable cartridge of claim 1 wherein the contact element has a solid core.

23. A method of operation of a plasma arc torch, the method comprising:
    installing a consumable cartridge in the plasma arc torch, the consumable cartridge having a cartridge frame with a first end and a second end that define a longitudinal axis, the consumable cartridge including (i) a protuberance configured to engage a switch for sensing a presence of a consumable component of the plasma arc torch, the protuberance activating the switch when the cartridge is installed in the plasma arc torch, and (ii) an electrically conductive contact element confined by the cartridge frame within a set of guide tracks and freely translatable up to a predetermined distance within the set of guide tracks;
    translating the contact element in a first direction along the longitudinal axis toward the first end once contact is made with a torch plunger of the plasma arc torch; and
    translating an electrode of the plasma arc torch in a second direction opposite the first direction along the longitudinal axis, the electrode contacting the contact element during a plasma operation of the plasma arc torch;
    wherein the contact element is separated from the electrode when the plasma arc torch is not performing the plasma operation.

* * * * *